(12) United States Patent
Jamin et al.

(10) Patent No.: US 10,341,314 B2
(45) Date of Patent: Jul. 2, 2019

(54) METHOD OF SECURITY AND VERIFIABILITY OF AN ELECTRONIC VOTE

(71) Applicant: ELECTION-EUROPE, Boulogne Billancourt (FR)

(72) Inventors: Régis Jamin, Velizy (FR); Christopher Dahl, Cambridge, MA (US)

(73) Assignee: ELECTION-EUROPE, Boulogne Billancourt (FR)

( * ) Notice: Subject to any disclaimer, the term of this patent is extended or adjusted under 35 U.S.C. 154(b) by 124 days.

(21) Appl. No.: 15/248,330

(22) Filed: Aug. 26, 2016

(65) Prior Publication Data

US 2017/0085544 A1    Mar. 23, 2017

(51) Int. Cl.
*G01C 13/00* (2006.01)
*H04L 29/06* (2006.01)
*G07C 13/00* (2006.01)

(52) U.S. Cl.
CPC ............ *H04L 63/061* (2013.01); *G07C 13/00* (2013.01); *H04L 63/0435* (2013.01); *H04L 63/0442* (2013.01); *H04L 63/12* (2013.01); *G06Q 2230/00* (2013.01)

(58) Field of Classification Search
CPC . H04L 63/0435; H04L 63/12; H04L 63/0442; H04L 63/061; G07C 13/00; G06Q 2230/00
USPC ......................................................... 713/171
See application file for complete search history.

(56) References Cited

U.S. PATENT DOCUMENTS

| | | | | |
|---|---|---|---|---|
| 5,495,532 A | * | 2/1996 | Kilian | G07C 13/00 380/28 |
| 6,081,793 A | * | 6/2000 | Challener | G07C 13/00 235/386 |
| 6,317,833 B1 | * | 11/2001 | Jakobsson | G07C 13/00 380/30 |
| 7,418,401 B2 | * | 8/2008 | Bogasky | G07C 13/00 705/12 |
| 8,297,506 B2 | * | 10/2012 | Backert | G06F 21/36 235/386 |
| 9,401,059 B2 | * | 7/2016 | Backert | G07C 13/00 |
| 2002/0077885 A1 | * | 6/2002 | Karro | G07C 13/00 705/12 |

(Continued)

*Primary Examiner* — Michael Pyzocha
*Assistant Examiner* — Zoha Piyadehghibi Tafaghodi
(74) *Attorney, Agent, or Firm* — Cozen O'Connor

(57) ABSTRACT

A method of security and verifiability of an electronic vote, comprising reception of a temporary voting ballot, during which a temporary voting ballot is received by a voting entity, the temporary voting ballot being encrypted by a public voting encryption key; reception of a validation voting ballot, during which a validation voting ballot is received from the voting entity, the validation voting ballot being encrypted by a public validation encryption key; decrypting the validation voting ballot by a private validation key associated with the public validation encryption key; validating a validation request generated from the decrypted validation voting ballot sent to the voting entity; the preceding steps being repeated until the acceptance of the validation request by the voting entity, after which the encrypted temporary voting ballot is registered as a definitive voting ballot awaiting its counting.

10 Claims, 1 Drawing Sheet

(56) References Cited

U.S. PATENT DOCUMENTS

| | | | |
|---|---|---|---|
| 2002/0077887 A1* | 6/2002 | London Shrader | G07C 13/00 705/12 |
| 2002/0143610 A1* | 10/2002 | Munyer | G06Q 10/10 705/12 |
| 2008/0000969 A1* | 1/2008 | Salomonsen | G07C 13/00 235/386 |
| 2009/0121019 A1* | 5/2009 | Bauchot | G06K 19/07345 235/386 |
| 2010/0121765 A1 | 5/2010 | Ahrens et al. | |
| 2014/0237614 A1* | 8/2014 | Irvine | G06F 21/6218 726/26 |
| 2015/0012339 A1* | 1/2015 | Onischuk | G07C 13/00 705/12 |

\* cited by examiner

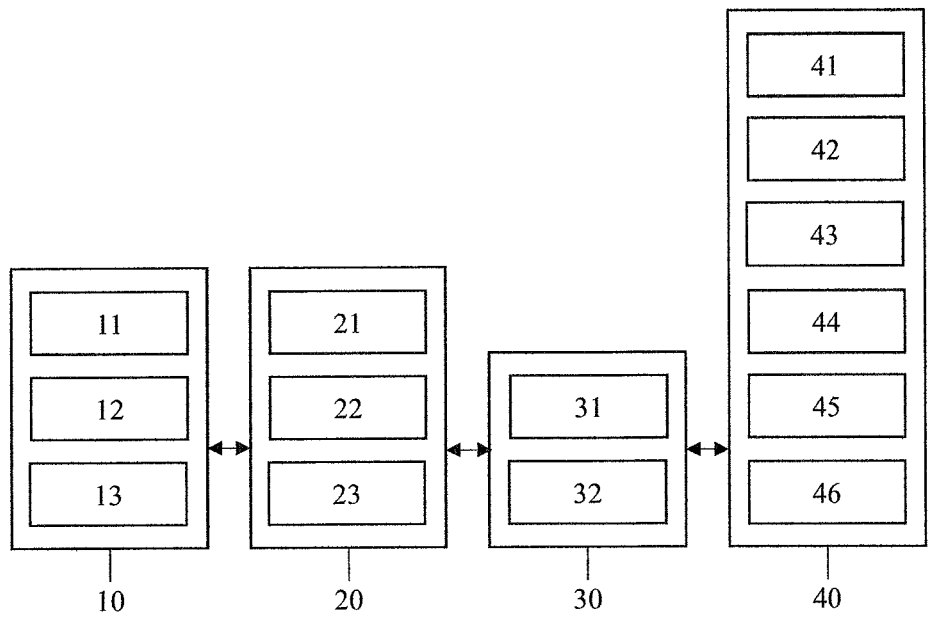
Figure 1
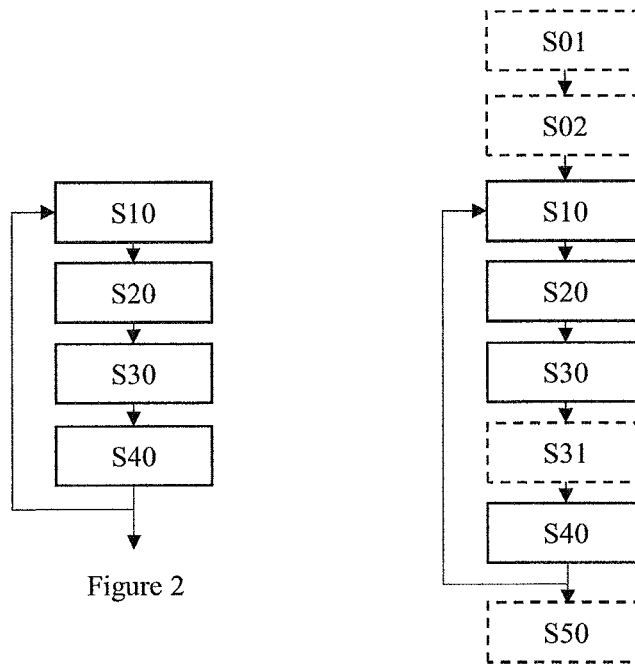
Figure 2
Figure 3

METHOD OF SECURITY AND VERIFIABILITY OF AN ELECTRONIC VOTE

RELATED APPLICATIONS

This application claims the priority of French application no. 1558047 filed Aug. 28, 2015, the entire content of which is hereby incorporated by reference.

BACKGROUND OF THE INVENTION

The subject matter of the invention is a method of security and verifiability of an electronic vote.

Electronic voting systems may be subject to problems of security, especially regarding the integrity and truthfulness of the voting data.

Electronic voting systems are known which are based on software using an encryption system of RSA type by a module or a program based on Java language. However, with such systems, the encryption and the transmission of the voting ballot are done solely by the computer means used by the voter, for example, on the computer of the voter. Moreover, with such systems, the same encryption keys are used for each voter. In particular, the encrypted voting ballot is sent directly to a host database, a virtual ballot box, and no check is made for the integrity of the data and thus the truthfulness of the data. Thus, these systems are potentially vulnerable, especially to the modification of the programs or the modules inspired by Java language and to an interception and manipulation of a "html" component of the Internet page of the voting ballot.

Moreover, an electronic voting system should meet the needs of the Commission Nationale de l'Informatique et des Libertés (National Commission of Information and Freedoms, CNIL) which advocates in particular that the voting ballots be encrypted in uninterrupted fashion, which requires the use of software embedded on the web browser, but also meet the needs of the Agence Nationale de la Sécurité et des Systèmes d'Information (National Agency of Information Security and Systems, ANSSI) which recommends avoiding the use of lightweight applications such as Java applications on Internet browsers to manage the security of transactions. An electronic voting system should likewise conform to the security references of the OWASP (Open Web Application Security Project) Top Ten 2013.

SUMMARY OF THE INVENTION

One object of the invention is to provide an electronic voting system able to guarantee anonymity of the voting ballot, as well as the integrity, the confidentiality, and the uniqueness of the electronic vote.

This and other objects are attained in accordance with one aspect of the present invention directed to a method of security and verifiability of an electronic vote, the method being implemented by computer means and comprising:

a step of reception of a temporary voting ballot, during which a temporary voting ballot is received by a voting entity, the temporary voting ballot being encrypted by means of a public voting encryption key, a step of reception of a validation voting ballot, during which a validation voting ballot is received from said voting entity, the validation voting ballot being encrypted by means of a public validation encryption key, a decryption step, during which the validation voting ballot is decrypted by means of a private validation key associated with said public validation encryption key, a validation step, during which a validation request generated from the decrypted validation voting ballot is sent to said voting entity, the preceding steps being repeated until the acceptance of the validation request by said voting entity, after which the encrypted temporary voting ballot is registered as a definitive voting ballot awaiting its counting.

Advantageously, the method of security and verifiability of an electronic vote is able to meet the paradigms of the governmental recommendations in the area of security as issued by the CNIL and the ANSSI, while still conforming to the security reference of the OWASP Top Ten 2013.

Moreover, the voting ballot is subjected to a double encryption and the encryption of the voting ballot is done in uninterrupted manner.

Advantageously, the use of a validation voting ballot allows the voting entity to verify its electronic vote before the latter is taken into account, and thus to validate that it corresponds to its vote, or to invalidate it if it differs from its choice.

Moreover, the method of security and verifiability of an electronic vote is able to guarantee the fidelity, the confidentiality, the integrity, the uniqueness and the anonymity of the electronic voting ballot.

Embodiments of the invention can likewise comprise one or more of the following characteristics, taken individually or in all possible combinations:

the method comprises, prior to the steps of receiving of a temporary voting ballot and validation, a sending step during which at least one voting ballot definition, one public encryption voting key, and one public validation encryption key are sent to a voting entity; and/or the method comprises, prior to the sending step, a step of selection of at least one public encryption validation key, during which at least one public encryption validation key is randomly selected among a set of public encryption validation keys; and/or the public encryption validation key is different from the public encryption voting key; and/or the private encryption voting key associated with the public encryption voting key is different from the private encryption validation key associated with the public encryption validation key; and/or the method comprises, prior to the validation step, a verification step by the voter during which the content of the validation voting ballot is verified; and/or during the validation step, as soon as the validation request is generated, the validation voting ballot is eliminated; and/or the temporary voting ballot is not decrypted; and/or prior to the repeating of the steps, the encrypted temporary voting ballot is eliminated; and/or the private encryption voting key associated with the public encryption temporary voting ballot is accessible only to the voting scrutineers.

Another aspect of the invention is directed to a data processing program product, such as a computer program product, comprising one or more sequences of instructions stored and accessible to a processor, and which when executed by the processor make the processor execute the steps of the method according to the invention.

Another aspect of the invention is directed to a storage medium readable by a data processing means, the storage medium comprising at least one program, and in which the program makes the computer execute the steps of the method according to the invention.

Another aspect of the invention is directed to a device comprising a processor configured to store one or more sequences of instructions and to execute at least one of the steps of the method according to the invention.

Unless otherwise indicated, terms such as "calculate", "determine", "evaluate" or the like refer to the action of a data processing means which manipulates and/or transforms physical data, such as electronic data or quantities within records and/or memories, into other physical data, such as quantities within memories of the data processing system, registers or other means of storage, transmission or displaying.

Moreover, the embodiments of the present invention are not described in reference to a particular programming language. A variety of programming languages can be used to implement the method according to the invention.

BRIEF DESCRIPTION OF THE DRAWINGS

Other characteristics and advantages of the present invention will appear upon perusal of the following description and figures:

FIG. 1 illustrates an architecture of the execution environment of an electronic voting according to one embodiment of the invention, and FIGS. 2 and 3 represent a flow chart of the steps of the method of security and verifiability of an electronic according to one embodiment of the invention.

It should be noted that these drawings have the sole purpose of illustrating the text of the description and do not constitute any limitation on the scope of the invention.

In the various figures, analogous elements are designated by identical reference numbers.

DETAILED DESCRIPTION OF THE DRAWINGS

The invention pertains to the field of electronic voting. In particular, an example of an architecture of the environment for execution of an electronic voting is illustrated in FIG. 1.

The environment of an electronic voting may comprise actors of the electronic voting system 10, network services 20, cryptography services 30, and database servers 40.

The actors of the electronic voting system 10 include, for example, the electors 11, the members of the polling stations 12, the central president and the electoral commission 13, possibly assisted by a bailiff or an expert in the field.

The network services 20 may comprise an Internet site 21 for electronic voting, an interface 22 for the administration of the electronic voting and the tracking of the polling, and an Internet web service 23 for the generating of the encryption keys.

The cryptography services 30 may include an Internet web service 31 used by the Internet site 21 for electronic voting and an Internet web service 32 used by the interface 22 of the administration of the electronic voting.

The database servers 40 include a plurality of databases. For example, as represented in FIG. 1, the database servers 40 comprise a database 41 where the encryption keys are stored, a database 42 where the definitions of the voting ballots are stored for each profile of elector, temporary ballot boxes 43 where the voting ballots are stored awaiting validation of the elector, ballot boxes 44 where the validated encrypted voting ballots are stored corresponding to each election, tables of results 45 filled out after the decryption of the voting ballots, and poll books 46 of the electors.

The actors of the system interact, for example, with the cryptography services 30 and the databases 40 by means of the network services 20.

Advantageously, the exchanges between the different entities of the electronic voting environment take place through a secure network, especially a secure Internet network. For example, the exchanges can be done by the secured hypertext transfer protocol ("https"). The secure connection between the different entities of the electronic voting environment makes it possible to guarantee the confidentiality and the integrity of the voting ballots, making sure that there is no possibility of an outside person looking at the voting ballot or gaining access to the content of the voting ballot of the elector.

Preferably, the response time of the network services 20, the cryptography services 30 and the database servers 40 are optimized to allow the elector to vote quickly and without constraints.

Furthermore, the elector can vote in full confidentiality by using any data processing means connected to the Internet network. In fact, the elector can connect to the Internet electronic voting site 21 via a secure connection in "https" mode and identify himself using an identifier and an associated password in order to cast his electronic vote. No downloading of software is required, the definition of the voting ballots and the public encryption voting and validation keys being sent to the Internet browser of the voter.

More precisely, the elector, if registered on the electoral list, will be assigned a unique identifier, making it possible to ensure that his vote is unique. This identifier is then associated with a password, which allows the voter to connect to the electronic voting system. Furthermore, the civil record data corresponding to an elector is kept in a different database and is only associated with him when necessary, for example, for the recording in the poll book, for the sending of personal vote reception receipt or for searching an electoral list. Thus, in the view of the voting system, an elector is associated with a random number.

As soon as its connection occurs, the system establishes a transaction, for example, via IIS, between the Internet browser of the elector and the Internet electronic voting site 21. This transaction is associated with a unique random number by the IIS transaction engine, which will be saved in a database representing the electronic voting actions in progress and which number will be associated with the unique identifier of the elector. After this transaction, the elector only exists by his random transaction number assigned by IIS. The random transaction number is designed to last only for the electronic voting time and to be erased upon confirmation of the vote by the elector, or if the elector remains inactive too long by the Internet electronic voting site 21. The elector can thus exchange voting data with the system in total anonymity of his IIS transaction and through a SSL/TLS encryption pipeline.

The invention concerns a method of security and verifiability of an electronic vote, particularly in an electronic vote execution environment as described above.

The method according to the invention is implemented by data processing means, such as computers, connected tablets, portable telephones, or any other data processing means having access to the Internet network.

A preferred embodiment of the method according to the invention is represented in FIG. 2. The method of security and verifiability of an electronic vote comprises:

a step S10 of reception of a temporary voting ballot,
a step S20 of reception of a validation voting ballot, a step S30 of decryption, and a step S40 of validation.

During the step S10 of reception of a temporary voting ballot, a temporary voting ballot is received by a voting entity. A voting entity corresponds to an entity performing the electronic voting, such as an elector. The temporary voting ballot is intended to be registered as a definitive voting ballot after validation of the voting entity.

The temporary voting ballot is encrypted by means of a public encryption voting key. The public encryption voting key is associated with a private encryption voting key. More precisely, a pair of voting encryption keys is associated with a temporary voting ballot, then to a definitive voting ballot when the temporary voting ballot is registered as a definitive voting ballot.

Advantageously, the encryption used is an asymmetrical encryption of the RSA encryption type. For example, the public encryption voting key makes it possible to encrypt the temporary voting ballot and the private encryption voting key makes it possible to decrypt the definitive voting ballot.

The public encryption voting key is stored in a database 40, for example, the database 41 for storage of the encryption keys. The public encryption voting key is generated by the Internet network service 23 for the generation of the encryption keys, then transmitted to the database 41 via the Internet network service 32 used by the interface 22 of the electronic voting administration.

The private encryption voting key is kept on a backup device outside of the Internet network. For example, the private encryption voting key can be written onto a backup device of the USB key type, designed to be kept by the central president and/or the electoral commission 13 in a strongbox. Advantageously, the private encryption voting key associated with the public encryption key of the temporary voting ballot is accessible only to the electoral commission when the voting is finished.

The encrypted temporary voting ballot sent by the voting entity is received by the network services 20, for example, by the Internet electronic voting site 21, then transmitted to a cryptography service 30, especially the Internet network service 31.

The encrypted temporary voting ballot is kept in a database, such as the temporary ballot box 43.

During the step S20 of reception of a validation voting ballot, a validation voting ballot is received from the voting entity.

Advantageously, the temporary voting ballot and the validation voting ballot are received jointly from the remote entity.

The validation voting ballot is encrypted by means of a public encryption validation key. In other words, a pair of validation encryption keys is associated with a validation voting ballot.

Advantageously, the validation encryption is an asymmetrical encryption of the RSA encryption type.

The private encryption validation key and the public encryption validation key are saved in a database, for example, the database 41 for storage of the encryption keys.

The pair of validation encryption keys is generated by the Internet network service 23 for the generating of encryption keys, and then transmitted to the database 41 via the Internet network service 32.

Advantageously, the public encryption validation key is different from the public encryption voting key. Likewise, the private encryption voting key associated with the public encryption voting key is advantageously different from the private encryption validation key associated with the public encryption validation key.

The encrypted validation voting ballot is received by the network services 20, for example, by the Internet electronic voting site 21, then transmitted to a cryptography service 30, especially to an Internet network service 31 used by the Internet electronic voting site 21.

During the decryption step S30, the validation voting ballot is decrypted by means of a private encryption validation key associated with said public encryption validation key.

The private encryption validation key is first extracted from the database in which it is stored in order to enable decrypting of the validation voting ballot.

During the step S40 of validation, a validation request generated from the validation voting ballot is sent to the voting entity.

Advantageously, the definition of the voting ballot is likewise extracted from the database in which it is stored, for example the database 42.

The definition of a voting ballot corresponds to the profile of an elector and to the data resulting from this, such as the names of the lists or the candidates up for election. The decrypted validation voting ballot can be compared with the definition of the voting ballot prior to the sending of the validation request to the voting entity.

While waiting for the validation of the validation request, the validation voting ballot is not kept in a database, but rather stored in a memory of the cryptography service 30 giving the validation voting ballot an ephemeral nature.

After the reception of the validation request, the voting entity can validate or invalidate the validation request. In other words, the voter can validate his vote if it conforms to his choice, or invalidate it if it does not correspond to his choice.

Steps S10 to S40 are repeated until the approval of the validation request by the voting entity.

If the validation request is validated by the voting entity, the encrypted temporary voting ballot is registered as a definitive voting ballot awaiting vote counting, and the validation voting ballot is eliminated from the memory of the cryptography service 30.

Advantageously, prior to the repeating of the steps, the encrypted temporary voting ballot is eliminated.

The temporary voting ballot is not decrypted.

After the validation of the validation request, the temporary voting ballot is transferred from the temporary database in which it was stored to a new database. For example, the temporary voting ballot can be moved from the temporary ballot box 43 to the ballot box 44 where the validated encrypted voting ballots are kept.

In other words, after the validation of the validation request, the validation of the IIS transaction, otherwise known as the "commit", is done and the temporary voting ballot is transferred from the database of voting ballots awaiting confirmation to the database of definitive voting ballots.

Upon registering the definitive voting ballot, an indication is made that said voting entity has voted. In other words, when the encrypted temporary voting ballot is registered as a definitive voting ballot, the poll book entry for that voting entity is automatically filled out and the voting entity receives a vote confirmation.

The validation of the transaction makes it possible to trigger the signing of the elector on the list of voters since the IIS transaction is finished.

Preferably, there is no link between the database of voting ballots and the database of the poll book, so that the anonymity of the data exchanged in the IIS voting transaction is guaranteed, the link between the name of the voter and the content of his ballot being broken as of the connection established by the elector, that is, as of his identification on the Internet electronic voting site 21.

The unique random number of the identifier of the elector makes possible a match up with the elector. The immediate automatic signing of the poll book makes it possible to prevent any attempt at double voting, and to guarantee the uniqueness of the electronic vote.

Preferably, during the step S40 of validation, as soon as the validation request is generated, the validation voting ballot is eliminated. More precisely, the validation voting ballot, encrypted or decrypted, is not kept in a database or on a hard disk. The validation voting ballot is designed to be kept in a RAM of the cryptography service 30, before being eliminated. The decrypted validation voting ballot can exist only on the browser of the voting entity and in the memory of a cryptography service, such as the Internet network service 31 used by the Internet electronic voting site 21.

The steps S10 to S40 make it possible to guarantee the uninterrupted encryption of the voting ballot as of its issuance on the data processing means of the elector. Moreover, the generating of an encrypted temporary voting ballot and an encrypted validation voting ballot makes it possible to guarantee a double encryption of the data.

Moreover, the validation request received by the voting entity allows the voter to verify the integrity of his vote.

Advantageously, a plurality of validation voting ballots encrypted with different public encryption validation keys can be generated for each temporary voting ballot. More precisely, the validation request can be generated from a validation voting ballot selected randomly from among the plurality of validation voting ballots. The random selection of a validation voting ballot from among the plurality of validation voting ballots associated with the temporary voting ballot enables increased security of the electronic vote.

As illustrated in FIG. 3, the method can also include, prior to the step S40 of validation, a step S31 of verification by the voter.

During the verification step S31 by the voter, the content of the validation voting ballot is verified.

The verification step makes it possible to limit the risks of electronic voting piracy. In fact, the voter can check in reliable manner to make sure that his vote has been taken into account by the system, without having been modified, and that is has not been manipulated, for example, by a malware program present in the computer used. In particular, the voter can make sure that the validation voting ballot transmitted is indeed the one that was issued.

The method can also include a step S01 of selection of at least one public encryption validation key. During the selection step S01, at least one public encryption validation key is randomly selected from among a set of public encryption validation keys.

Advantageously, after the selection step S01 the method includes a sending step S02. During the sending step S02, at least one voting ballot definition, one public encryption voting key and one public encryption validation key are sent to a voting entity.

After a step of connection and identification of the voting entity, the voting ballot definition and the public encryption voting and validation keys can be sent to the Internet browser of the voting entity.

The method can also include a step S50 of vote counting. During the counting step S50, a private encryption voting key associated with the public encryption voting key is received and the definitive voting ballots are decrypted by means of said private encryption key.

The private encryption voting keys kept solely by the president and the electoral commission are loaded, after the closing of the balloting, in the database where they will be kept to enable the vote counting after the closure of the balloting, for example, the database 41 where the encryption keys are kept. The private encryption voting keys are used to decrypt the definitive voting ballots of the voters. The voting results are transmitted to a database, for example, to result tables 45.

After the filling of the databases with the voting results, official reports containing information as to the result of the election and the content of the poll book are sent, for example, to the members of the polling stations.

The invention has been described in the case where one validation voting ballot is received from the voting entity. Of course, the method according to the invention is in no way limited to the embodiment described and illustrated, which is given only as an example. On the contrary, the method according to the invention could involve a plurality of validation voting ballots associated with the temporary voting ballot, so as to increase the security of the electronic vote.

The invention claimed is:

1. A method of securing and verifying an electronic vote, the method being implemented by at least one processing device, the method comprising the steps of:
    receiving a temporary voting ballot from a voting entity, the temporary voting ballot being encrypted by a public voting encryption key;
    receiving one or more validation voting ballots from the voting entity for the temporary voting ballot, the one or more validation voting ballots each being encrypted by a public validation encryption key, of one or more public validation encryption keys, the one or more public validation encryption keys each being different from the public voting encryption key;
    decrypting the one or more validation voting ballots using one or more respective private validation encryption keys corresponding to the one or more public validation encryption keys used to encrypt the one or more respective validation voting ballots; and
    sending a validation request generated based on the one or more decrypted validation voting ballots to the voting entity,
    wherein upon receiving, from the voting entity, a validation of the validation request, the encrypted temporary voting ballot is registered as a definitive voting ballot to be counted without having been decrypted and the one or more validation voting ballots are eliminated.

2. The method according to claim 1, comprising, prior to receiving the temporary voting ballot and receiving the validation voting ballots,
    sending at least one voting ballot definition, a public encryption voting key, and one or more public validation encryption keys to the voting entity.

3. The method according to claim 2, comprising, prior to the sending of the at least one voting ballot definition, randomly selecting at least one public encryption validation key to be sent with the at least one voting ballot definition from among the one or more public encryption validation keys.

4. The method according to claim 1, wherein the private encryption voting key associated with the public encryption voting key is different from the one or more private encryption validation keys associated with the one or more public encryption validation keys.

5. The method according to claim 1, comprising verifying, by the voter, the content of the validation voting ballot.

6. The method according to claim 1, wherein the one or more validation voting ballots are eliminated when the validation request is generated.

7. The method according to claim 1, wherein, upon receiving from the voting entity an invalidation of the validation request, the encrypted temporary voting ballot is eliminated and the method is repeated.

8. The method according to claim 1, wherein the private encryption voting key associated with the public encryption temporary voting ballot is accessible only to voting scrutineers.

9. The method according to claim 1, further comprising:
   sending the encrypted temporary voting ballot to the voting entity.

10. The method according to claim 1, wherein the validation request is generated from a randomly selected one of the one or more decrypted validation voting ballots.

* * * * *

UNITED STATES PATENT AND TRADEMARK OFFICE
CERTIFICATE OF CORRECTION

PATENT NO. : 10,341,314 B2
APPLICATION NO. : 15/248330
DATED : July 2, 2019
INVENTOR(S) : Jamin et al.

Page 1 of 1

It is certified that error appears in the above-identified patent and that said Letters Patent is hereby corrected as shown below:

On the Title Page

Insert:
Item --(30) Foreign Application Priority Data
Aug. 28, 2015 (FR) 1558047--

Signed and Sealed this
Twenty-fourth Day of December, 2019

Andrei Iancu
*Director of the United States Patent and Trademark Office*